(No Model.)
F. WEYANDT, Jr.
ROAD CART.
No. 446,310. Patented Feb. 10, 1891.
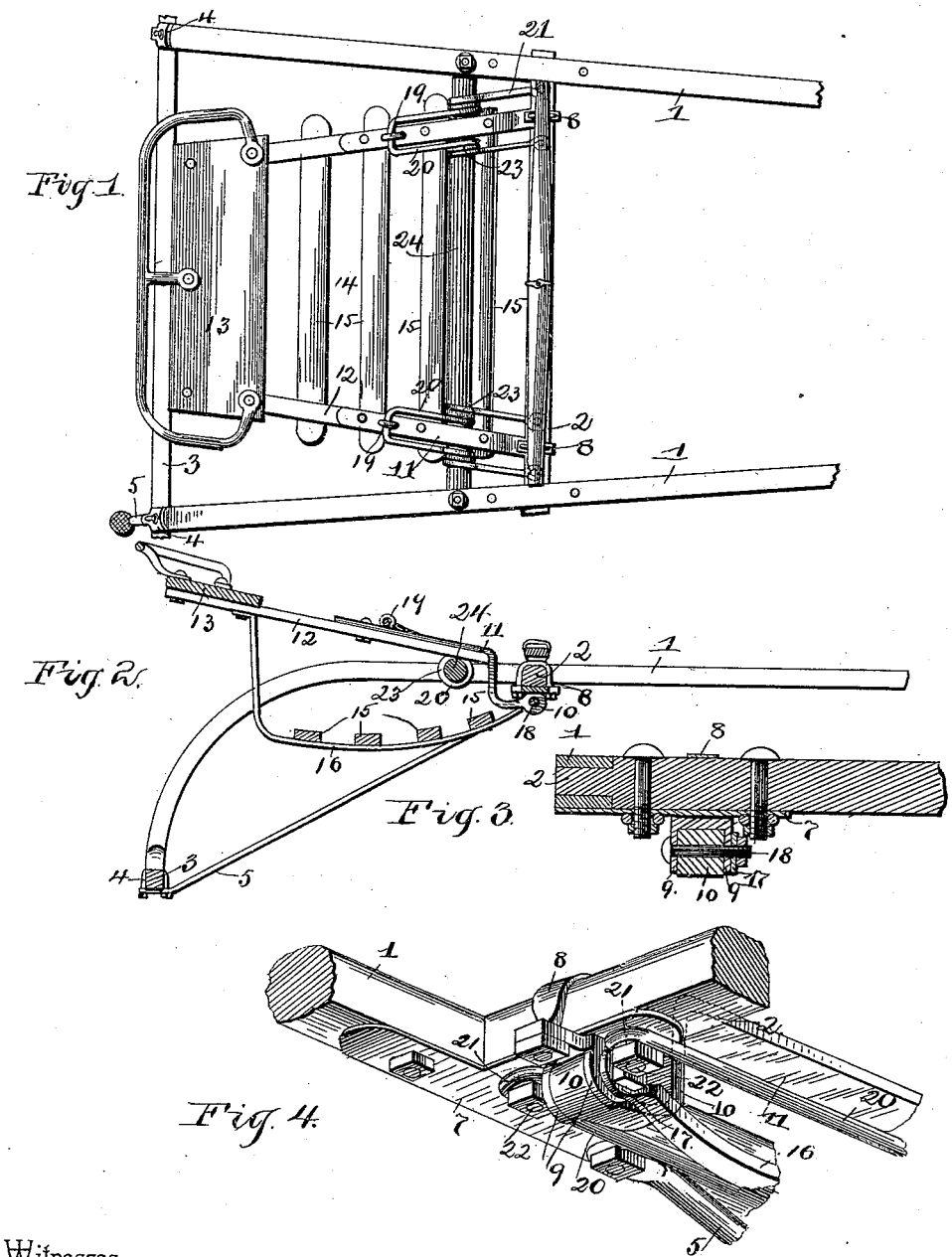

UNITED STATES PATENT OFFICE.

FRED WEYANDT, JR., OF DUNMORE, PENNSYLVANIA.

ROAD-CART.

SPECIFICATION forming part of Letters Patent No. 446,310, dated February 10, 1891.

Application filed November 6, 1890. Serial No. 370,502. (No model.)

*To all whom it may concern:*

Be it known that I, FRED WEYANDT, Jr., a citizen of the United States, residing at Dunmore, in the county of Lackawanna and State of Pennsylvania, have invented a new and useful Road-Cart, of which the following is a specification.

The invention relates to improvements in road-carts.

The object of the present invention is to simplify and improve the construction of road-carts, eliminate the usual side motion, and prevent the motion of the horse being communicated to the occupant of the vehicle.

The invention consists in the construction and novel combination and arrangement of parts, hereinafter fully described, illustrated in the accompanying drawings, and pointed out in the claims hereto appended.

In the drawings, Figure 1 is a plan view of a road-cart constructed in accordance with this invention. Fig. 2 is a longitudinal sectional view. Fig. 3 is a detail sectional view. Fig. 4 is a detail perspective view.

Referring to the accompanying drawings, 1 1 designate a pair of shafts connected near their rear ends by the usual cross-bar 2, and having their rear ends curved downward and secured to an axle 3 by means of plates 4, bolted on the front and rear faces of the ends of the shafts, and having their lower ends threaded and engaged by nuts that secure the rear ends of braces 5 beneath the axle 3, and one of said braces has formed integral with it a step 6. The front ends of the braces 5 are bolted to the lower faces of the shaft at points slightly in the rear of the cross-bar 2 and the latter is secured to the shafts by T-plates 7, which prevent the tenon ends of the cross-bar becoming disengaged from the mortises of the shafts. The cross-bar 2 is provided a short distance from its ends with clips 8, provided with dependent ears 9, between which are hinged the ends 10 of plates 11, which are bolted to the forward ends of side bars 12, which support a seat 13, arranged at their rear ends.

The foot-board 14 is composed of transverse slats 15 and bottom bars 16, which have their rear ends secured to the side bars 12 at a point beneath the seat, and their front ends are provided with eyes 17 and are secured to the clips 8 by the coupling-bolts 18 and also secured by the plates of the side bars to the clips. The front ends of the plates 11 are curved downward and forward and provided with eyes, through which the coupling-bolts 18 and the plates are provided near their rear ends with loops 19, to which are attached springs 20, which retain the side bars and seat in proper position and prevent jars and shocks being communicated thereto.

The springs 20 are each constructed of a single piece of metal, which is doubled on itself and passed through the eye 19, and is coiled on each side of the side bar 12, and has its ends 21 provided with eyes and secured beneath the cross-bar on opposite sides of the clip by the bolts 22, which secure the T-plates to the cross-bar. The coil 23 of the springs is supported by a round bar 24, which passes through the coil and has its ends secured beneath the shafts.

It will be seen that the construction is simple and inexpensive, that side motion is eliminated, and that the motion of the horse is prevented being communicated to the occupant of the vehicle.

What I claim is—

1. In a road-cart, the combination of the shafts, the cross-bar 2, connecting the shafts and provided near its end with clips, the side bars 12, carrying the seat and having their forward ends hinged to the clip, the foot-board having its rear end secured to the side bars 12 and the front end hinged to the clips, and the springs coiled around the cross-bar and connected to the side bars 12, substantially as described.

2. In a road-cart, the combination of the shafts, the cross-bar 2, provided with clips having depending ears, the side bars 12, carrying the seat and having their front ends provided with plates, hinged to the rear of said clip, the foot-board having the rear ends of its bars 16 secured to the side bars and hinged to the clips, and the springs, each constructed of a single piece of metal, attached to the side bars and provided with coils and having its ends secured to the cross-bar 2, substantially as described.

3. In a road-cart, the combination of the shafts, the cross-bar 2, the clips arranged near the ends of the cross-bar and provided with depending ears, the coupling-bolts 18, the side bars 12, supporting the seat, the plates secured to the front end of the side bars 12 and having their front ends provided with eyes and hinged to the clips by said coupling-bolts, the foot-board composed of transverse slats, and the bars 16, having their rear ends secured to the side bars 12 and their front ends provided with eyes and secured to the coupling-bolts, the springs, each constructed of a single piece of metal doubled on itself and attached at its bend to the side bars 12, and provided with coils and having its ends secured to the cross-bar, and the bar 24, passing through the coils of the springs and arranged beneath the side bars 12 and secured to the shafts, substantially as described.

In testimony that I claim the foregoing as my own I have hereto affixed my signature in presence of two witnesses.

FRED WEYANDT, JR.

Witnesses:
JOHN W. MCGUIRE,
FRED WITHERS.